United States Patent

Prenger

[11] Patent Number: 5,948,332
[45] Date of Patent: Sep. 7, 1999

[54] METHOD FOR MANUFACTURING BIAXIALLY ORIENTED TUBING FROM THERMOPLASTIC MATERIAL

[75] Inventor: Jan Hendrik Prenger, Hardenberg, Netherlands

[73] Assignee: Wavin B.V., Netherlands

[21] Appl. No.: 08/716,416

[22] PCT Filed: Mar. 17, 1995

[86] PCT No.: PCT/NL95/00100

§ 371 Date: Nov. 18, 1996

§ 102(e) Date: Nov. 18, 1996

[87] PCT Pub. No.: WO95/25627

PCT Pub. Date: Sep. 28, 1995

[30] Foreign Application Priority Data

Mar. 22, 1994 [NL] Netherlands ............................ 9400453

[51] Int. Cl.$^6$ ................................................ B29C 47/92
[52] U.S. Cl. ........................ 264/40.5; 264/40.6; 264/40.7; 264/209.5; 264/290.2; 425/140; 425/325; 425/392
[58] Field of Search ................................ 264/290.2, 40.1, 264/40.5, 40.6, 40.7, 209.4, 209.5, 569; 425/140, 325, 384, 352

[56] References Cited

U.S. PATENT DOCUMENTS

| | | | |
|---|---|---|---|
| 3,249,671 | 5/1966 | Perrone et al. | 264/209.5 |
| 3,313,870 | 4/1967 | Yazawa | 264/559 |
| 3,812,230 | 5/1974 | Takahashi | 264/89 |
| 3,856,905 | 12/1974 | Dawson | 264/230 |
| 4,209,475 | 6/1980 | Herrington et al. | 264/569 |
| 4,472,343 | 9/1984 | Kawamura et al. | 264/569 |
| 4,613,532 | 9/1986 | Michel et al. | |
| 4,749,531 | 6/1988 | Borger et al. | 264/40.7 |
| 4,842,803 | 6/1989 | Bose et al. | 264/569 |
| 5,096,634 | 3/1992 | Tsadares et al. | |
| 5,403,539 | 4/1995 | Taka et al. | 264/569 |
| 5,449,487 | 9/1995 | Jarvenkyla | 264/209.5 |

FOREIGN PATENT DOCUMENTS

| | | |
|---|---|---|
| 0 087 036 | 8/1983 | European Pat. Off. . |
| 0 153 511 | 9/1985 | European Pat. Off. . |
| 2 357 210 | 6/1974 | Germany . |

*Primary Examiner*—Jon Silbaugh
*Assistant Examiner*—Mark Eashoo
*Attorney, Agent, or Firm*—Blank Rome Comisky & McCauley LLP

[57] ABSTRACT

Method and device for manufacturing biaxially oriented tubing from thermoplastic material. The method includes forcing the tube over a mandrel at an orientation temperature of the plastic material, which mandrel includes an expansion part which produces expansion in the circumferential direction of the tube, and downstream of the mandrel the exertion of an axial pulling force on the tube, in the course of which the tube encounters a resistance which counteracts the movement of the tube over the mandrel. The method also includes the exertion of an influence sector-wise in an adjustable manner in the circumferential direction of the tube on the resistance which counteracts the movement of the tube over the mandrel. In an advantageous embodiment, the temperature of the plastic material of the tube is influenced sector-wise in an adjustable manner, viewed in the circumferential direction of the tube. The measures according to the invention lead to better control over the manufacture of biaxially oriented tubing.

20 Claims, 3 Drawing Sheets

METHOD FOR MANUFACTURING BIAXIALLY ORIENTED TUBING FROM THERMOPLASTIC MATERIAL

BACKGROUND OF THE INVENTION

1. Field of the Invention

The present invention relates to a method for manufacturing biaxially oriented tube from thermoplastic material, comprising forcing the tube over a mandrel at an orientation temperature of the plastic material, which mandrel comprises an expansion part which produces expansion in the circumferential direction of the tube, and downstream of the mandrel the exertion of an axial pulling force on the tube, in the course of which the tube encounters a resistance which counteracts the movement of the tube over the mandrel. In the context of the present invention the term tube also relates to hose-type products.

2. Description of the Prior Art

The object of biaxially orienting the plastic material of a tube, also known as biaxially drawing a tube, is to improve the properties of the tube through orientation of the molecules of the plastic material of the tube in two mutually perpendicular directions. In the case of a certain generally known method the biaxial orientation is produced by forcing the tube over a mandrel at a suitable temperature, by exerting an axial pulling force on the tube downstream of the mandrel. Forcing the tube over the mandrel can also be assisted by additionally exerting a pushing force on the tube upstream of the mandrel, in the direction of the mandrel. This leads to a reduction in the necessary pulling force and makes a greater degree of drawing possible. The mandrel comprises an expansion part which produces the increase in the dimensions in the circumferential direction of the tube. It is essentially this which determines the orientation of the plastic material in the circumferential direction. The axial pulling force essentially determines the orientation in the axial direction. The biaxial orientation obtained is fixed (frozen) by cooling the tube.

A method of the type described in the preamble is already known from DE 2,357,210 (Petzetakis). This publication describes how a round tube with a relatively thick wall is manufactured in a known manner by means of an extruder. Viewed in the direction of movement of the tube, a solid, undeformable mandrel with a tapered expansion part is situated downstream of the extruder. The tube is forced over the mandrel at an orientation temperature which is suitable for the plastic material concerned, through an axial pulling force being exerted on the tube downstream of the mandrel. The diameter of the tube consequently increases, and the wall thickness decreases.

In the path between the extruder and the conical expansion part of the mandrel the extruded tube passes through means whose purpose is to produce the most homogeneous tube possible before the expansion in the circumferential direction occurs. This means that an effort is made to obtain a uniform wall thickness in the circumferential direction of the tube wall, inter alia by carrying out a calibration of the external diameter. An effort is also made to bring the plastic material of the tube wall to a uniform temperature, which temperature is the most suitable temperature for the envisaged biaxial orientation in the case in question.

It is found in practice that the manufacture of biaxially oriented tubing by the known method is not sufficiently controllable. This makes the known method unsuitable for use as a continuous process on an industrial scale, in particular because it is not found possible to obtain biaxially oriented tubing of an acceptable quality. In particular, it is found that with the known method it is not possible to obtain a tube with a sufficiently uniform wall thickness and biaxial orientation. An example of the unsatisfactory controllability of the process is that with the known method often a tube with a thickened part in the tube wall extending in the lengthwise direction of the tube is obtained.

SUMMARY OF THE INVENTION

The object of the present invention is to eliminate the abovementioned disadvantages and to provide a method which produces a biaxial orientation with considerably improved controllability.

This object is achieved by a method of the type described in the preamble, which is characterized in that the method also comprises exerting an influence sector-wise in an adjustable manner in the circumferential direction of the tube on the resistance which counteracts the movement of the tube over the mandrel.

While the plastic material of the tube is passing over the mandrel it encounters a resistance which counteracts the movement of the tube over said mandrel. Said resistance depends on several parameters, such as the temperature of the plastic material, the wall thickness of the tube upstream of the mandrel, the friction between the tube and the mandrel, and the shape of the mandrel. The prior art, such as DE 2,357,210 discloses measures whose object is to make the first two parameters mentioned (wall thickness and temperature) as uniform as possible before the tube reaches the mandrel and is deformed there. In this case the commonly accepted idea until now has been that if the tube is supplied to the mandrel in the most homogeneous state possible, the plastic material, viewed in the circumferential direction of the tube, will deform entirely uniformly when passing over the mandrel. In other words, therefore, it is assumed that the wall thickness of the tube remains uniform, viewed in the circumferential direction, while it is passing over the mandrel.

The measure proposed is based on the important insight that obtaining a resistance which is uniform, viewed in each sector of the circumference of the tube, is virtually impossible without said resistance being influenced in some other way. For example, in the case of an industrial application of the method described in the preamble variations always occur in the abovementioned parameters, irrespective of the way in which efforts are made to keep such parameters uniform. There is another important parameter whose influence on the resistance has not been recognized until now. It is the orientation of the plastic molecules in the tube wall before the tube is biaxially oriented. In the case of an extrusion process the orientation of the molecules in the extruded tube is not uniform, in particular viewed in the circumferential direction of said tube. This is the case, for example, when an extruder with a cross head is being used, where a joint line is always present at the point where the melt flows merge in the cross head. The known means according to the prior art in a method of the type mentioned in the preamble, which means are situated in the path between the extruder and the expansion part of the mandrel, do not produce any effective homogenization in the orientation of the molecules. Since the plastic material is in a readily deformable state when passing over the mandrel, the distribution of the plastic material around the mandrel will be influenced by differences in resistance present between the sectors. This leads to the wall thickness of the tube, viewed in a cross-section at right angles to the axis of the mandrel, no longer being uniform when the tube leaves the mandrel. In the ultimately manufactured tube this variation in the wall thickness remains apparent, with the result that the tube is unsuitable for practical use. Moreover, in the sector of the tube where there is a variation in the wall thickness the biaxial orientation obtained will not correspond to that in the other sectors of the tube. The measure according to the invention therefore ensures that the resistance which the tube encounters when passing over the mandrel can be influenced sector-wise, viewed in the circumferential direction of the tube, in order to prevent such deviations.

The measure according to the invention is also advantageous in a situation in which upstream of the mandrel a pushing force is exerted by pushing means on the tube in the direction of the mandrel. This pushing force, together with the axial pulling force exerted on the tube downstream of the mandrel, then ensures that the tube is forced over the mandrel. Any influence of the pushing means on the homogeneity of the tube can then be compensated for by the measure according to the invention.

The method according to the invention preferably ensures that the influence on the resistance encountered by the tube while it is passing over the mandrel is at least effective when the tube is undergoing the expansion in the circumferential direction while passing over the expansion part of the mandrel. It is clear that in particular while the tube is passing over the expansion part of the mandrel, which is the region in which the tube encounters the greater part of the resistance, wall thickness differences could easily occur if the method of influencing the resistance were not provided. Once a deviation has arisen in the wall thickness and the biaxial orientation, it can no longer be reversed at a later stage. If the influence is to be really effective during the passage over the expansion part of the mandrel, it may be necessary to commence the influencing of the resistance already upstream of the expansion part. This depends in particular on the method used for influencing the resistance.

In a preferred embodiment the exertion of an influence in an adjustable manner in the circumferential direction of the tube on the resistance which counteracts the movement of the tube over the mandrel consists of influencing the temperature of the plastic material of the tube. This method of influencing the resistance can be achieved in a simple manner in practice and can be carried out not only from the outside of the tube, but also from the inside of the tube, possibly in combination. Through a local raising of the temperature, the plastic material of the tube will flow more readily at that point under the stress occurring. This therefore means that the resistance encountered by the tube while it is passing over the mandrel is influenced. By means of a local change in the temperature of the plastic material on the inside of the tube, an influence can also be exerted on the friction resistance between said part of the tube and the mandrel. In this case the mandrel can be provided with individually controllable heating elements disposed around the circumference of the mandrel.

In another embodiment, or in conjunction with the above-mentioned measure, the exertion of an influence in an adjustable manner in the circumferential direction of the tube on the resistance which counteracts the movement of the tube over the mandrel can consist of influencing the shape of the mandrel. This can be achieved by, for example, a metal mandrel which comprises a core and movable segments situated around the core. The control of the movement of each segment could then be produced by thermal deformation of the connection between said segment and the core of the mandrel.

According to the present invention, the exertion of an influence in an adjustable manner in the circumferential direction of the tube on the resistance which counteracts the movement of the tube over the mandrel can also consist of influencing the friction between the tube and the mandrel. As described above, this friction, in particular the coefficient of friction, can be influenced by influencing the temperature of the inside of the tube. A lubricant can also be applied locally between the mandrel and the tube, in order to influence the friction.

For the provision of a method which is suitable for use as a continuous process for manufacturing biaxially oriented tubing, the influencing of the resistance which counteracts the movement of the tube over the mandrel is advantageously regulated depending on the characteristics of the tube measured downstream of the mandrel. In particular, it is advantageous for the method according to the present invention to be achieved through the fact that the exertion of an influence on the resistance which counteracts the movement of the tube over the mandrel is regulated depending on the cross-section profile of the tube measured downstream of the mandrel. In another embodiment, or in conjunction with the measurement of the cross-section profile of the tube, the orientation of the molecules of the biaxially oriented tube could, for example, be determined by means of a laser measuring device. Such a laser measuring device is described in, for example, EP 0,441,142 (Petzetakis).

The method advantageously also comprises regulating the axial pulling force exerted on the tube depending on the cross-section profile of the tube measured downstream of the mandrel. Regulating the pulling force means that an influence can be exerted on the wall thickness of the biaxially oriented tube obtained. If, for example, an excessive wall thickness is measured over the entire circumference of the tube, the axial pulling force is increased. This will make the wall thickness decrease over the entire circumference. Of course, the biaxial orientation is then also influenced. Another consequence of such a measure is that, through the change in the wall thickness, the external dimensions of the biaxially oriented tube obtained will also change. In order to be able to control this last-mentioned effect, and in order to be able to obtain the desired external diameter, it is proposed that at a distance downstream of the mandrel the tube should be pulled through a calibration opening bounded by calibration means, the calibration opening being such that it produces a reduction in the external dimensions of the tube.

In this respect it is important to recognize that after the tube has passed over the mandrel, it will shrink through cooling, in particular achieved by cooling means. In order to produce the effective reduction of the external dimensions of the tube envisaged according to the present invention, the calibration opening is therefore selected so that it is smaller than the external dimensions of the tube if allowance is made for the shrinkage occurring. The calibration means can be, for example, in the form of a solid draw plate having a calibration opening formed therein, or a number of rotary rollers which together bound the calibration opening.

The tube encounters a resistance at the moment when it is passing through the reducing calibration means. This resistance can be used advantageously in conjunction with the axial pulling force for controlling the biaxial drawing process.

In the case of the method according to the present invention it is very advantageous if the distance between the mandrel and the calibration opening is regulated. For this, the calibration means must, of course, be movable relative to the mandrel, which is a simple matter to achieve.

The distance between the mandrel and the calibration opening is preferably regulated depending on the external dimensions of the biaxially oriented tube measured downstream of the calibration opening.

The distance between the mandrel and the calibration opening is advantageously increased if the measured external dimensions of the biaxially oriented tube are smaller than the desired external dimensions, and the distance between the mandrel and the calibration opening is reduced if the measured external dimensions of the biaxially oriented tube are greater than the desired external dimensions.

In an advantageous embodiment of the method according to the invention the calibration means are cooled. The tube is also preferably further cooled downstream of the calibration means. The influence which the shrinkage of the tube caused by this cooling has on the external dimensions of the tube can be determined (for example, experimentally) and used for fixing or setting the dimensions of the calibration opening which are necessary for obtaining the desired external dimensions of the tube.

In accordance with these and other objects which will become apparent hereinafter, the instant invention will now be described with particular reference to the accompanying drawings.

BRIEF DESCRIPTION OF THE DRAWINGS

The above mentioned and other features and objects of this invention and the manner of obtaining them will become more apparent and the invention itself will be best understood by reference to the following description of an embodiment of the invention taken in conjunction with the accompanying drawings, wherein.

DETAILED DESCRIPTION OF THE INVENTION

Figure 1:
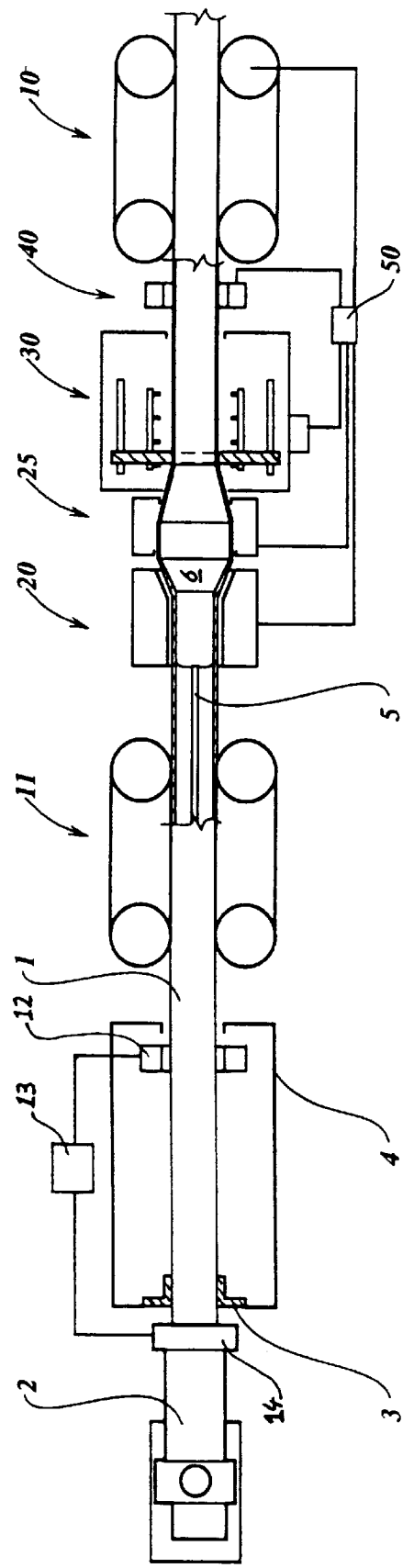
FIG. 1 shows a diagrammatic top view of an exemplary embodiment of a device for manufacturing biaxially oriented tubing by the method according to the invention.
Figure 2:
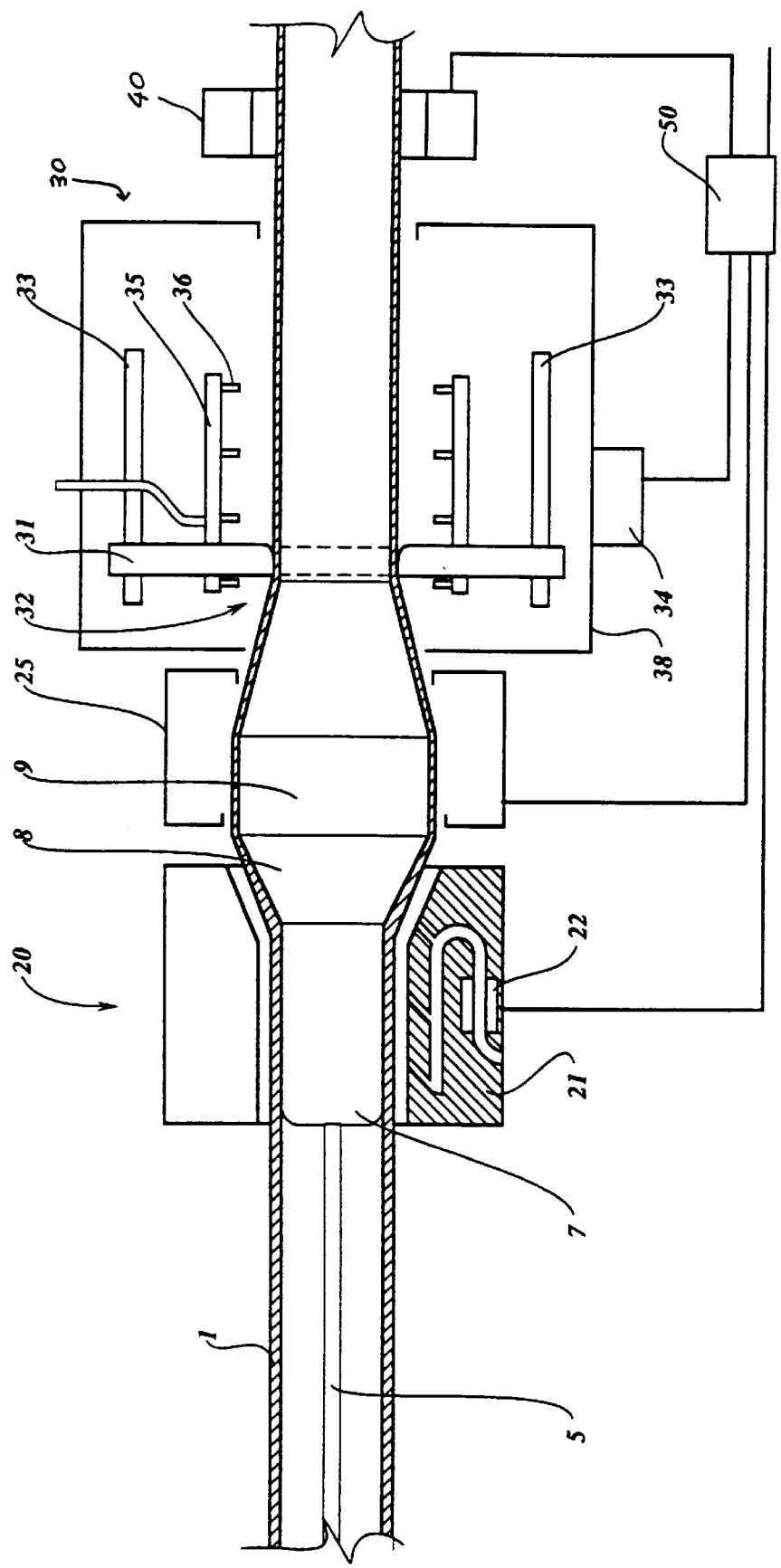
FIG. 2 shows on a larger scale the detail A in FIG. 1.
Figure 3:
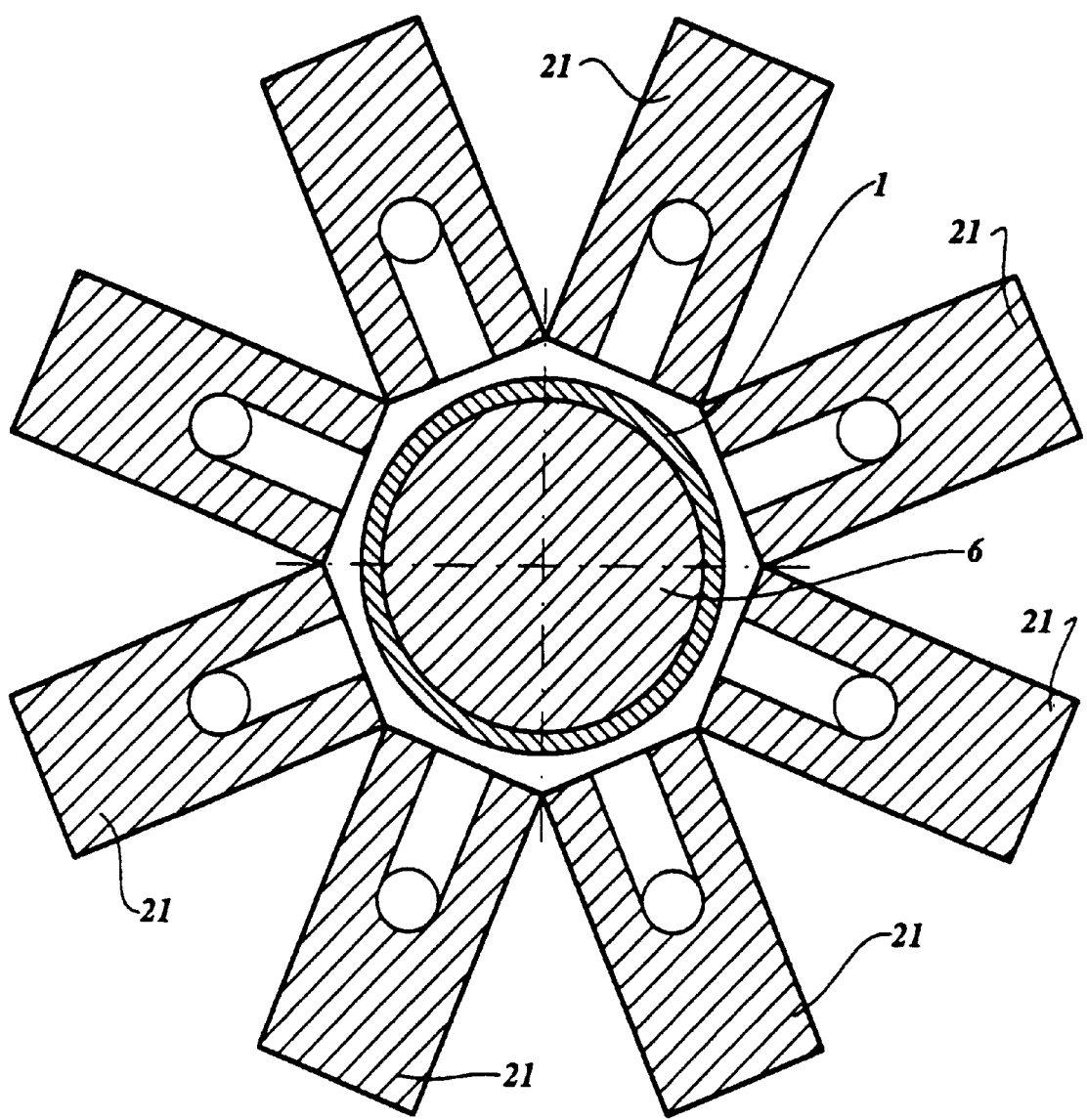
FIG. 3 shows diagrammatically a section along the line III—III in FIG. 1.

FIGS. 1, 2 and 3 are based on an application of the method according to the invention in which a tube with a smooth cylindrical wall is manufactured from thermoplastic material. It will be clear that the inventive idea and solutions described here can also be used for the manufacture of tubular sections of a different cross-section, if necessary by adapting the embodiment of the solutions described herein.

The tube 1 made of thermoplastic material is manufactured in a continuous process by means of an extruder 2. After leaving the extruder 2, the tube 1 passes through a calibration sleeve 3 and is subsequently brought to a temperature suitable for the biaxial orientation by means of temperature-regulating means 4, for example by cooling with air or water. Internal cooling of the tube 1 can also be provided.

The molecules of the plastic material of the tube 1 are biaxially oriented (in the lengthwise and circumferential direction of the tube) by forcing the tube 1 over a mandrel 6 fixed by a tension member 5 to the extruder 2. The mandrel 6 has a cylindrical run-on part 7, a conical expansion part 8 and a slightly tapered run-off part 9.

For forcing the tube 1 over the mandrel 6 a pulling device 10 is present downstream of the mandrel 6, by means of which device an axial pulling force can be exerted on the tube 1. A pushing device 11 is placed upstream of the mandrel 6, which pushing device is designed for exerting a pushing force on the tube 1 in the direction of the mandrel 6.

It is desired that the tube 1 has an even wall thickness over its entire circumference when the tube 1 leaves the extruder 2. To achieve this a measuring device 12, shown diagrammatically in the drawing, is placed between the extruder 2 and the pushing device 11. Said measuring device 12 is designed for measuring the cross-section profile of the tube 1, i.e. the shape and dimensions of the cross-section of the tube 1 can be determined by means of the measuring device 12. The measuring device 12 transmits a signal representing the cross-section to a control unit 13, which compares this signal with a signal representing the desired cross-section of the tube 1 before the tube 1 is biaxially oriented. Control signals based on the difference between these two signals are supplied by the control unit 13 to extrusion die 14 fitted on the extruder 2.

The extrusion die 14 has means to control the temperature of the die 14 sector-wise in the circumferential direction of the tube 1 extruded with the die 14. A system of the kind comprising measuring device 12, control unit 13, and extrusion die 14 is e.g. disclosed in EP-A- 0 153 511. By means of such a system in combination with the calibration sleeve 3, and the cooling device 4, the extruded tube 1 can be given a uniform cross-section and a uniform temperature at the exit of cooling device 4.

According to the present invention, as has been discussed above, uniformity (wall thickness, temperature) of the tube 1 at the stage where the tube 1 leaves the cooling device 4 does not ensure that the tube 1 still is uniform (in particular has a uniform cross-section) after it has been forced over the mandrel 6. Therefore the present invention proposes to use resistance-regulating means 20 for sector-wise and in an adjustable manner in the circumferential direction of the tube 1 influencing the resistance which the tube 1 encounters when passing over the mandrel 6.

To obtain the result that the resistance-regulating means actually effect the resistance which the tube encounters when the tube is passing over the mandrel, the resistance-regulating means are preferably located close to the mandrel, or comprised in the mandrel as is discussed above. When a pushing device is used, as is shown in the drawings, the resistance-regulating means are preferably located downstream of said pushing device to be able to counteract any disturbance caused by the pushing device. When no pushing device is used it is prefered that the resistance regulating means are located downstream of the cooling device behind the extruder, if possible close to the mandrel.

In the exemplary embodiment shown the resistance-regulating means 20 are located outside the mandrel 6 and are designed in such a way that they can exert an influence sector-wise on the temperature of the plastic material of the tube 1 situated on the outer circumference of the tube 1.

The resistance-regulating means 20 comprise eight regulable air jet units 21, placed near the mandrel 6 at regular intervals around the path of the tube 1 through the device. Each air jet unit 21 comprises a fan and heating element 22, by means of which the temperature and quantity of air blown out of said air jet unit 21 can be adjusted. The air jet units 21 are directed in such a way that each of them can exert an influence on the temperature of the plastic material of the tube 1 in a sector of the circumference of said tube 1. A detailed description of this resistance regulation will be given below.

At the level of the run-off part 9 of the mandrel 6 a first cooling of the tube 1 is already carried out by means of an external cooling device 25 set up there.

A calibration and cooling device 30 is situated at a distance away downstream of the mandrel 6. The calibration and cooling device 30 comprises a draw plate 31, in the form of a steel disc with a central, circular calibration opening 32. The draw plate 31 is slidably mounted on guide bars 33 of the frame of the calibration and cooling device 30, which frame is set up in a fixed place relative to the mandrel 6. In this way the distance between the draw plate 31 and the mandrel 6 can be adjusted within a suitable range. A diagrammatically shown movement unit 34 is present for moving the draw plate 31 along the guide bars 33.

Arms 35 with cooling medium spray nozzles 36 are fixed to the draw plate 31, for cooling the biaxially oriented tube 1 during and after its passage through the draw plate 31. The cooling medium, for example water, is supplied through a pipe 37 to the spray nozzles 36. The cooling medium is collected in a tank 38 placed around the calibration and cooling device 30.

A measuring device 40, shown diagrammatically in the drawing, is placed between the calibration and cooling device 30 and the pulling device 10. Said measuring device 40 is designed for measuring the cross-section profile of the biaxially oriented tube 1, i.e. the shape and dimensions of the cross-section of the tube 1 can be determined by means of the measuring device 40. The measuring device 40 transmits a signal representing the cross-section to a control unit 50, which compares this signal with a signal representing the desired cross-section of the tube 1. Control signals based on the difference between these two signals are supplied by the control unit 50 to the resistance-regulating means 20, to the cooling device 25, to the movement unit 34 of the calibration and cooling device 30, and to the pulling device 10. The effects envisaged by these control signals are explained below. Of course, the regulation can also be extended further and can cover, for example, the operation of the extruder 2.

The control signals supplied by the control unit 50 to the resistance-regulating means 20 are such that the operation of each air jet unit 21 can be adjusted separately by them. The temperature in the sector of the plastic material on the outer circumference of the tube 1 can be increased or reduced locally by means of an air jet unit 21 appertaining to said sector. A temperature increase means that the plastic material can flow more readily there under the influence of the stress occurring, with the result that the resistance encountered by the tube while it is passing through the mandrel is therefore influenced. The arrangement of the air jet units 21 around the path of the tube 1 through the device therefore means that the resistance encountered by the tube 1 while it is passing over the mandrel 6, viewed in the circumferential direction of the tube 1, can be influenced so that it can be adjusted sector-wise.

The simple embodiment of the resistance-regulating means 20 shown here already leads to a considerable improvement in the controllability of the biaxial orientation process compared with the method known from the prior art. In particular, it is now possible to keep the wall thickness of the tube 1 uniform, viewed in the circumferential direction of the tube 1, while the tube is passing over the mandrel 6. This makes it possible in a continuous process to obtain a biaxially oriented tube with a uniform wall thickness and uniform biaxial orientation.

In a variant which is not shown it is also possible, through changing the temperature of the plastic material in a sector on the inside of the tube 1, to exert an influence on the friction resistance between said sector of the tube 1 and the mandrel 6. In this case the mandrel 6 can be provided with individually controllable heating elements disposed around the circumference of the mandrel. As mentioned earlier and indicated in the claims, totally different ways of influencing the resistance encountered by the tube 1 while it is passing through the mandrel 6 are also possible.

The draw plate 31 is moved relative to the mandrel 6 by means of the control signal supplied to the movement unit 34 of the calibration and cooling device 30.

The diameter of the calibration opening 32 of the draw plate 31 is selected in such a way that the external diameter of the tube 1 is reduced while it is passing through the draw plate 31. The reduction in the external diameter produced by the draw plate 31 relative to the external diameter of the tube 1 when the latter leaves the mandrel 6 is greater than the reduction in the external diameter of the tube 1 resulting from the shrinkage through cooling of the tube 1. In other words, an effective force, which reduces the external diameter of the tube 1, is exerted by the draw plate 31 on the tube 1.

If it is found by the control unit 50 that the external diameter of the tube 1 is smaller than the desired external diameter, the control unit 50 transmits such a control signal to the movement unit 34 that the distance between the mandrel 6 and the draw plate 31 increases. However, if the external diameter of the tube 1 is greater than the desired external diameter, the draw plate 31 is moved towards the mandrel 6. The basic principle of this effect can be explained by the speed at which the external diameter of the tube 1 is reduced. This speed depends, inter alia, on the distance between mandrel 6 and draw plate 31. If the speed of reduction of the cross-section is relatively great, the ultimate diameter reduction is found to be greater than that at a lower speed (a great distance between the mandrel and the draw plate).

In the method described allowance must be made for further shrinkage of the tube 1 after it leaves the calibration opening 32. This is a generally known situation for which it is simple to make an allowance, so that ultimately a biaxially oriented tube with an accurate external diameter can be obtained.

The resistance formed by the draw plate 31 to the passage of the tube 1 can also advantageously be used for obtaining the desired biaxial orientation. Although this orientation is carried out essentially while the tube 1 is passing over the mandrel 6, it is found that the axial tension in the tube 1 in the path between the draw plate 31 and the pulling device 10 has an influence on the ultimately manufactured tube 1, even if the tube 1 is considerably colder in this path than during the passage over the mandrel 6. In particular, the tube 1 can be cooled in a suitable manner in the path between the mandrel 6 and the draw plate 31 by regulating the cooling device 25. Greater cooling then leads to an increase in the resistance formed by the draw plate 31. This change in the resistance, combined with the pulling force exerted on the tube 1, leads to a change in the axial tension in the tube 1. This method of changing the axial tension in the tube 1 can advantageously be used for obtaining the envisaged biaxial orientation.

I claim:

1. A method for manufacturing biaxially oriented tubing of thermoplastic material, comprising controlling biaxial drawing of the tubing by the steps of exerting an axial pulling force on the thermoplastic tubing and expanding the thermoplastic tubing in a circumferential direction by forcing the tubing of thermoplastic material over a mandrel at an orientation temperature of the thermoplastic material, said mandrel comprising an expansion which produces expansion in the circumferential direction of the tubing, exerting said axial pulling force on the tubing downstream of said mandrel for forcing the tubing over said mandrel, as a result of which the tubing encounters a resistance which counteracts movement of the tubing over said mandrel, and adjusting said resistance in sectors circumferentially about said mandrel to control said biaxial drawing of said tubing.

2. The method according to claim 1, wherein said resistance occurs when said tube is undergoing said expansion in circumferential direction while passing over said expansion part of said mandrel.

3. The method according to claim 1, wherein said resistance is adjusted by influencing the temperature of the thermoplastic material.

4. The method according to claim 1, wherein a shape of the mandrel affects the resistance.

5. The method according to claim 1, wherein friction between said tube and said mandrel affect the resistance.

6. The method according to claim 1, wherein the resistance is regulated depending on characteristics of said tube downstream of said mandrel.

7. The method according to claim 1, further comprising the steps of measuring the cross sectional profile of the tube downstream of said mandrel; and regulating said axial pulling force exerted on said tube based upon said measuring step.

8. The method according to claim 1, further comprising the step of pulling said tube through a calibration opening bounded by calibration means, said calibration opening being of such dimensions that it produces a reduction in the external dimensions of said tube.

9. A method of manufacturing biaxially oriented tubing from thermoplastic material by controlling biaxial drawing of the tubing, comprising the steps of:

expanding the thermoplastic material in a circumferential direction by forcing a tube of thermoplastic material over a mandrel at an orientation temperature of the thermoplastic material, said mandrel comprising an expansion part which produces expansion in the circumferential direction of said tube;

exerting an axial pulling force on the tube downstream of said mandrel whereby said tube encounters a resistance which counteracts movement of said tube over said mandrel;

measuring the cross-section profile of said tube downstream of said mandrel, and adjusting the resistance in sectors in the circumferential direction of the tube based upon said measuring step.

10. A method of manufacturing biaxially oriented tubing from thermoplastic material by controlling biaxial drawing of the tubing, comprising the steps of:

expanding the thermoplastic material in a circumferential direction by forcing a tube of thermoplastic material over a mandrel at an orientation temperature of the thermoplastic material, said mandrel comprising an expansion part which produces expansion in the circumferential direction of said tube;

exerting an axial pulling force on the tube downstream of said mandrel in the course of which said tube encounters a resistance which counteracts the movement of said tube over said mandrel;

adjusting the resistance in sectors in the circumferential direction of the tube;

pulling said tube through a calibration opening downstream of said mandrel and bounded by calibration means, said calibration opening being of such dimensions that it produces a reduction in the external dimensions of said tube; and regulating the distance between the mandrel and the calibration opening.

11. A method of manufacturing biaxially oriented tubing from thermoplastic material by controlling biaxial drawing of the tubing, comprising the steps of:

expanding the thermoplastic material in a circumferential direction by forcing a tube of thermoplastic material over a mandrel at an orientation temperature of the thermoplastic material, said mandrel comprising an expansion part which produces expansion in the circumferential direction of said tube;

exerting an axial pulling force on the tube downstream of said mandrel as a result of which said tube encounters a resistance which counteracts the movement of said tube over said mandrel;

adjusting the resistance in sectors in the circumferential direction of the tube pulling said tube through a calibration opening bounded by calibration means, said calibration opening being of such dimensions that it produces a reduction in the external dimensions of said tube; and regulating the distance between the mandrel and the calibration opening depending on the external dimensions of the tube measured downstream of said calibration opening.

12. A method of manufacturing biaxially oriented tubing from thermoplastic material by controlling biaxial drawing of the tubing, comprising the steps of:

extruding a tube having a wall of thermoplastic material, cooling said tube by a first cooling device downstream of said extruder to an orientation temperature suitable for effecting biaxial orientation of said thermoplastic material, and forcing said tube over a mandrel downstream of said first cooling device when said tube is at said orientation temperature by applying a pulling force on said tube by a pulling means downstream of said mandrel to overcome a resistance which counteracts said forcing of said tube over said mandrel, wherein said tube is considered to be divided into sectors in a circumferential direction of said tube and wherein for each sector of said tube disposing an individually adjustable resistance-regulating means near said mandrel for regulating said resistance which counteracts said forcing of said tube over said mandrel.

13. A method of manufacturing biaxially oriented tubing from thermoplastic material, comprising the steps of extruding a tube having a wall of thermoplastic material, cooling said tube by a first cooling device downstream of said extruder to an orientation temperature suitable for effecting biaxial orientation of said thermoplastic material, and forcing said tube over a mandrel downstream of said first cooling device when said tube is at said orientation temperature by applying a pulling force on said tube by a pulling means downstream of said mandrel, wherein said mandrel is fixed to said extruder by a tension member extending between said extruder and said mandrel, said mandrel comprises an expansion section which produces expansion in a circumferential direction of the tube, wherein the method further comprises cooling said tube by a second cooling device downstream of said expansion section of said mandrel;

wherein said tube is considered to be divided into sectors in the circumferential direction of said tube;

and wherein between said first cooling means and said mandrel an individually controlled heating element is provided for each sector of said tube for controlling the temperature of said sector of said tube.

14. The method according to claim 13, wherein said mandrel has a circumference and said individually controllable heating elements are disposed inside said mandrel distributed around the circumference of said mandrel.

15. The method according to claim 13, wherein said individually controllable heating elements are air jet units disposed around said tube near said mandrel.

16. The method according to claim 13, wherein said individually controllable heating elements are air jet units disposed around said tube near said mandrel, each air jet comprising a fan and a heater.

17. The method according to claim 13, wherein said method further comprises applying a pushing force on said tube upstream of said expansion section of said mandrel and downstream of said first cooling device by pushing means acting externally upon said tube, and wherein said individually controllable heating elements are located between said pushing means and said mandrel.

18. A method of manufacturing biaxially oriented tubing from thermoplastic material by controlling biaxial drawing of the tubing, comprising the steps of extruding a tube having a wall of thermoplastic material, cooling said tube by a first cooling device downstream of said extruder to an orientation temperature suitable for causing biaxial orientation of said thermoplastic material, and forcing said tube over a mandrel downstream of said first cooling device when said tube is at said orientation temperature by applying a pulling force on said tube by a pulling means downstream of said mandrel, wherein said mandrel is fixed to said extruder by a tension member extending between said extruder and said mandrel, said mandrel comprises an expansion section which produces expansion in a circumferential direction of the tube such that the tube encounters a resistance which counteracts movement of the tube over said mandrel, wherein the method further comprises cooling said tube by a second cooling device downstream of said expansion section of said mandrel; and wherein said mandrel has a variable shape in circumferential direction for adjusting said resistance in sectors circumferentially about said mandrel to control said forcing of said tube over said mandrel.

19. A method of manufacturing biaxially oriented tubing from thermoplastic material by controlling biaxial drawing of the tubing, comprising the steps of extruding a tube having a wall of thermoplastic material, cooling said tube by a first cooling device downstream of said extruder to an orientation temperature suitable for causing biaxial orientation of said thermoplastic material, and forcing said tube over a mandrel downstream of said first cooling device when said tube is at said orientation temperature by applying a pulling force on said tube by a pulling means downstream of said mandrel, wherein said mandrel is fixed to said extruder by a tension member extending between said extruder and said mandrel, said mandrel comprises an expansion section which produces expansion in a circumferential direction of the tube, wherein the method further comprises cooling said tube by a second cooling device downstream of said expansion section of said mandrel;

wherein said tube is considered to be divided into sectors in the circumferential direction of said tube and wherein resistance-regulating means are disposed near said mandrel for regulating a resistance for each sector of said tube which counteracts said forcing of said tube over said mandrel; and wherein at a distance downstream of said mandrel said tube passes through a calibration opening bounded by calibration means, said calibration opening producing a reduction of external dimensions of said tube, wherein said distance between said calibration opening and said mandrel is regulated depending on external dimensions of said tube, which are measured downstream of said calibration opening.

20. The method according to claim 19, wherein a tube of desired external dimension is manufactured, and wherein said distance between said calibration opening and said mandrel is increased if said external dimensions measured downstream of said calibration opening are smaller than said desired external dimensions and wherein said distance between said calibration opening and said mandrel is reduced if said external dimensions measured downstream of said calibration opening are larger than said desired external dimensions.

* * * * *